United States Patent [19]

Zirps

[11] 4,354,517

[45] Oct. 19, 1982

[54] PRESSURE VALVE

[75] Inventor: Wilhelm Zirps, Hemmingen, Fed. Rep. of Germany

[73] Assignee: Robert Bosch GmbH, Stuttgart, Fed. Rep. of Germany

[21] Appl. No.: 175,192

[22] Filed: Jul. 31, 1980

[30] Foreign Application Priority Data

Aug. 10, 1979 [DE] Fed. Rep. of Germany ....... 2932434

[51] Int. Cl.³ .......................................... G05D 24/00
[52] U.S. Cl. .................................... 132/110; 137/468
[58] Field of Search ............... 137/468, 491, 489, 488, 137/492, 492.5, 110

[56] References Cited

U.S. PATENT DOCUMENTS

| 3,395,726 | 8/1968 | Cross et al. | 137/468 |
| 3,820,444 | 6/1974 | Ward | 137/491 X |
| 3,977,423 | 8/1976 | Clayton | 137/488 X |
| 4,148,336 | 4/1979 | Leinemenn | 137/491 |

Primary Examiner—Alan Cohan

Attorney, Agent, or Firm—Michael J. Striker

[57] ABSTRACT

The valve for a pressure-medium-operated hydraulic arrangement has a housing provided with an inlet and an outlet, a slide piston located downstream of the inlet and seal-tightly movable in an opening of the housing under the action of the pressure medium entering the same so as to subdivide the pressure medium into a first stream flowing directly to the outlet and a second constant stream, a laminar throttle member located downstream of the slide piston and associated with a spring-biased control member wherein the laminar throttle member and the control member are arranged so that the constant stream flows through the laminar throttle member and generates pressure drop which acts upon the control member against its bias, and the control member subdivides the constant stream into two partial streams which flow to the outlet means and one of which is throttled, whereby the pressure drop between the inlet and the outlet is maintained at a constant level and thereby the viscosity of the pressure medium is maintained constant.

15 Claims, 1 Drawing Figure

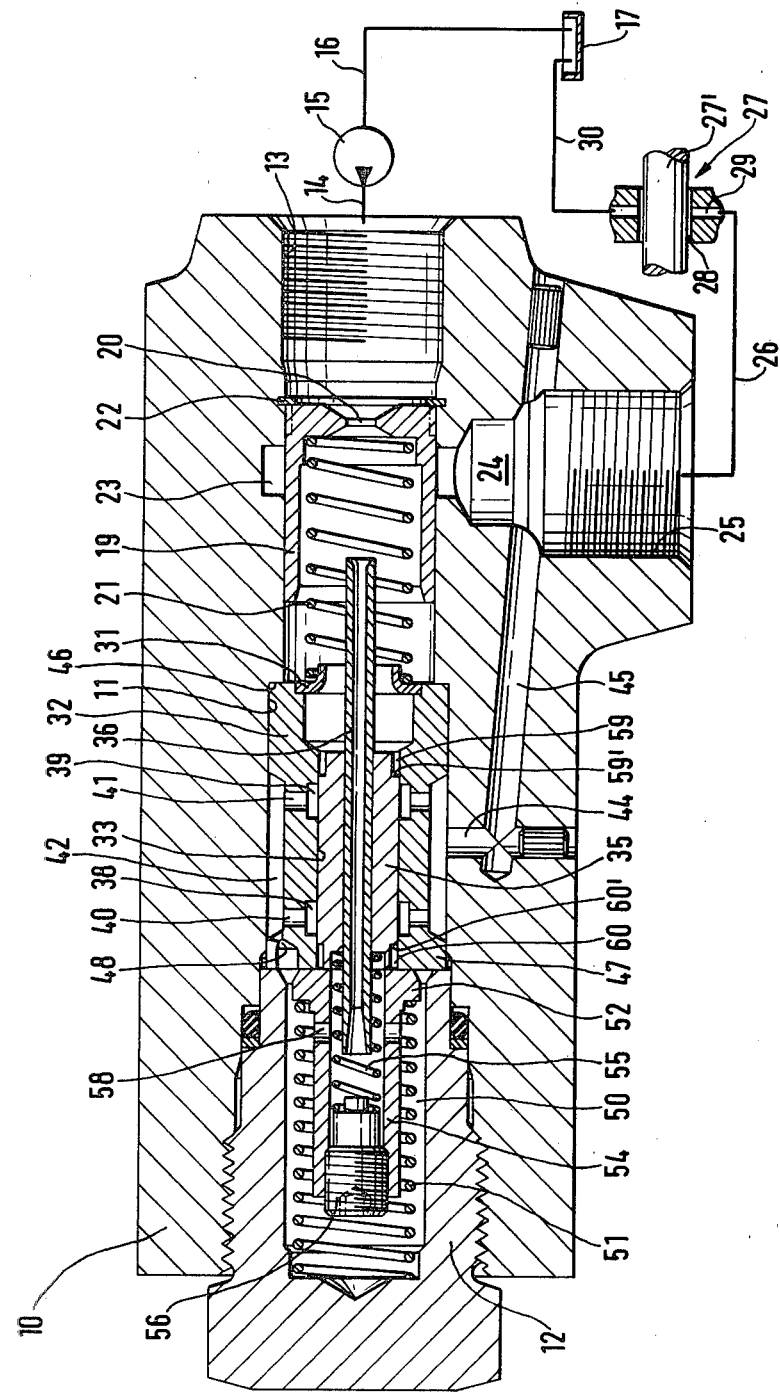

PRESSURE VALVE

BACKGROUND OF THE INVENTION

The present invention relates to a pressure valve.

In some fields of application of pressure valves it is required to maintain the viscosity of the pressure medium constant. For example, the viscosity of the pressure medium must be maintained constant in a lubrication circuit in which the pressure medium circulates. Known pressure valves, however, are not designed for maintaining the viscosity of the pressure medium constant.

SUMMARY OF THE INVENTION

Accordingly, it is an object of the present invention to provide a pressure valve which avoids the disadvantages of the prior art.

More particularly, it is an object of the present invention to provide a pressure valve which in the beginning of operation of a hydraulic system quickly brings the characteristics of the pressure medium to an optimal value and then maintains the same constant. In other words, the inventive pressure valve is intended to maintain the viscosity of the pressure medium always constant.

In keeping with these objects and with others which will become apparent hereinafter, one feature of the present invention resides, briefly stated, in a pressure valve which includes a spring-biased distributing slide piston which seal-tightly moves in an opening of a valve housing and is acted upon by a pressure medium entering the latter, which is characterized by that the slide piston subdivides the entering pressure medium into a first stream which flows directly to a consumer and a second constant stream, wherein the latter flows through a laminar throttle and acts by thus generated pressure drop upon a control member displaceable against the force of the spring, and the constant stream is subdivided into two partial streams which flow to the consumer and one of which always flows through a throttling element.

When the valve is designed in accordance with the present invention, the pressure drop between the inlet and an outlet of the valve can be controlled so that the viscosity or the temperature of the pressure medium in a hydraulic system is maintained constant.

The throttling element may be formed as a pressure release valve. The laminar throttle may be fixedly connected with the control member for joint movement in the housing.

The slide piston may be spring-biased and provided with an inner hollow and a throttle which is arranged so that when the pressure medium enters the housing through the inlet and flows through the throttle of the slide piston, pressure drop takes place in the throttle and moves the slide piston against its bias. The slide piston is biased by a control spring.

The laminar throttle may be formed as a gauge tube which is coaxial with the slide piston, located downstream of the same, and movable together with the control member under the action of the pressure drop in the latter. The control member may be formed as a two-edge control piston.

A spring-biased movable element may be provided, acting upon the control member and biased toward the latter by a spring. An adjusting threaded member may be located inside the movable member so as to adjust the bias of the control member. More particularly, the threaded member adjusts a spring located inside the movable element and biasing the control member.

The control member may be formed as two-edge control piston having two control edges, and a guide member receives the control member and has two annular grooves which communicate the control edges of the control member with an annular chamber which, in turn, communicates with the outlet of the housing.

The novel features which are considered as characteristic for the present invention are set forth in particular in the appended claims. The invention itself, however, both as to its construction and its method of operation, together with additional objects and advantages therefor, will be best understood from the following description of specific embodiments when read in connection with the accompanying drawings.

BRIEF DESCRIPTION OF THE DRAWINGS

The single FIGURE of the drawing is a view showing a section of a pressure valve in accordance with the present invention.

DESCRIPTION OF A PREFERRED EMBODIMENT

A valve in accordance with the present invention has a housing 10 provided with a throughgoing longitudinal opening 11. The longitudinal opening 11 is closed at its one side by a hollow threaded member 12. The other end of the opening forms an inlet 13 which is connected with a conduit 14. The conduit 14 communicates with a pump 15 which aspirates via a suction conduit 16 pressure oil from a container 17.

A cup-shaped distributing slide piston 19 is seal-tightly guided in the opening 11 of the housing 10. The slide piston 19 has a throttling opening 20 provided at its side which faces toward the inlet 13. The slide piston abuts against an abutment 22 provided in the opening 11, under the action of a control spring 21. An annular groove 23 is arranged downstream of the abutment 22. A transverse opening 24 opens into the annular groove 23 and communicates with an outlet 25 which is connected with a consumer conduit 26.

Reference numeral 27 identifies a consumer which in this case is a shaft lubrication system. The latter includes an opening 28 receiving a shaft 27', and an opening 29 which is connected with the consumer conduit 26 and opens into the opening 28. Oil exiting from the opening 28 flows via a return conduit 30 to the container 17.

The control spring 21 abuts against a guide in member 32 via a spring pad 31. The member 32 has a through-going longitudinal opening 33 which is coaxial with the longitudinal opening 11 of the housing 10. A cylindrical control member 35 is seal-tightly guided in the opening 33 of the member 32 for longitudinal movement. The control member 35 is fixedly connected with a capillary or gauge tube 36. The tube 36 extends coaxial with the opening 11 of the housing and protrudes axially beyond both sides of the control member 35 and partially into the open side of the slide piston 19.

The guide member 32 has two annular grooves 38 and 39 which are spaced from one another in the longitudinal direction. Two transverse openings 40 and 41 extend from the annular grooves 38 and 39 outwardly and open into an annular space 42. The latter is formed between the outer surface of the guide member 32 and the inner wall of the opening 11 of the housing 10. An opening 44 provided in the housing 10 opens into the annular space 42, on the one hand, and communicates via a passage 45 with the transverse opening 24 and thereby with the outlet 25, on the other hand.

The guide member 32 is pressed against a shoulder 46 formed in the opening 11, in direction away from the hollow threaded member 12. The guide member 32 has a flange-shaped edge 47 at its side which is opposite to the shoulder 46. A throttle 48 with a constant flow cross-section is formed in the edge 47. The throttle 48 communicates the annular space 42 with a space 50 formed inside of the hollow threaded member 12.

A pressure spring 51 is located in the space 50. One end of the spring 51 abuts against an edge 52 of a hollow body 54 and the latter is pressed against the front side of the guide member 32. A pressure spring 55 is arranged inside the hollow body 54. One end of the pressure spring 55 abuts against a threaded member 56 connected with the hollow body 54, whereas the other end of the pressure spring 55 abuts against the control member 35. The pressure spring 55 displaces the control member 35 together with the gauge tube 36 in direction toward the slide piston 19. Several transverse openings 58 are provided in the hollow body 54 and communicate the interior of the latter with the space 50.

Both end faces of the control member 35 are provided with recesses 59 and 60 which are formed as annular grooves. The recesses 59 and 60 have shoulders 59' and 60' which form control edges with the annular grooves 38 and 39.

The above-described pressure valve operates as follows:

When the pump 15 supplies the pressure medium into the inlet 13, the throttling opening 20 causes a pressure drop which displaces the slide piston 19 in direction toward the gauge tube 36. After a predetermined displacement, the opening 11 communicates with the annular groove 23, and thereby the valve acts as a regular flow control valve. A constant stream Q2 flows through the throttle 20 into the valve, whereas a residual stream Q1 flows via the opening 24 to the consumer 27.

The entire constant stream Q2 flows after the slide piston 19 first through the gauge tube. The pressure drop of this constant stream depends on the viscosity of the pressure medium and is associated for a given liquid, here oil, with its temperature.

When the operation of the system starts and the pressure medium is cold, the pressure drop in the gauge tube 36 is relatively great. Thereby, the gauge tube 36 together with the control member 35 is displaced against the spring 55 until the control member 35 abuts against the hollow body 54. In condition of respective higher pressure drop, the hollow body 54 is also displaced against the force of the pressure spring 51, and after a predetermined displacement provides for communication from the recess 59 to the annular groove 41.

Now, a part of the constant stream flows into the annular space 42 and then flows from the latter via the opening 44 and the passage 45 to the outlet 25 and the consumer 27. This stream forms a first branch. The residual stream forming a second branch flows through the gauge tube and then travels into the hollow body 54, through the transverse openings 58, and through the throttle 48 also into the annular space 42. Then, this stream flows as described hereinabove, to the consumer. Thus, the streams of the first and second branches join each other in the annular space 42.

The pressure drop between the inlet opening 13 and the outlet opening 25 depends thereby upon the pressure drop in the second branch, that is, upon the force of the spring 51 and the pressure drop in the throttle 48. Because of this, in the beginning of operation strong throttling of the pressure medium supplied by the pump 15 takes place. Namely, this throttling takes place first in the slide piston 19, on the one hand, and in the control member 35 and the throttle 48, on the other hand. As a result of this, the pressure medium is quickly heated. Since the viscosity of the pressure medium in condition of heating becomes smaller, the flow of the pressure medium through the gauge tube 36 increases. Thereby, the control member 35 displaces in the opposite direction under the action of the springs 51 and 55. The communication with the annular groove 39 is interrupted and the entire constant stream flows now through the gauge tube 36 and the throttle 48 to the annular space 42, which is described above as the second branch.

With further temperature increase of the pressure medium, the pressure drop in the gauge tube 36 gradually decreases, and the spring 55 displaces the control member 36 further in direction toward the slide piston 19. Thereby, the recess 60 of the control member 35 communicates with the annular groove 38. Because of this, a bypass is formed from the inner space of the hollow body 54 directly to the annular groove 38 and to the annular space 42 so as to form a third branch. With temperature increase, the pressure medium and the decreasing pressure drop at the throttle 48 decreases the pressure drop between the inlet opening 13 and the outlet opening 25 to such an extent that the temperature of the pressure medium is stabilized to a constant value and the pressure drop between the inlet and the outlet is adjusted in correspondence with the respective operational conditions.

By respective prestressing of the pressure spring 51 in connection with the throttle 48, the throttling of the pressure medium can be changed and thereby its heating time can be varied. By changing the prestressing of the spring 55 in connection with the length of the gauge tube 36, the desired temperature or viscosity of the pressure medium can be adjusted.

The throttle 48 may be formed in a special embodiment, as a pressure release valve. This can be advantageous when during the pressure drop between the inlet and outlet in the first and second phases, the heating must be constant.

It will be understood that each of the elements described above, or two or more together, may also find a useful application in other types of constructions differing from the type described above.

While the invention has been illustrated and described as embodied in a pressure valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A valve for a pressure-medium-operated hydraulic arrangement, comprising a housing having an opening; inlet means in said housing, for entry of a pressure medium; outlet means in said housing, for exit of the pressure medium to a consumer; a distributing slide piston located downstream of said inlet means and seal-tightly movable in said opening of said housing under the action of the pressure medium entering said housing, said slide piston being arranged so that the pressure medium is subdivided into a first stream flowing directly to said outlet means and a second constant stream; a laminar throttle member located downstream of said slide piston and associated with a spring-biased control member, said laminar throttle member and said control member being arranged so that said constant stream flows through said laminar throttle member and generates pressure drop which acts upon said control member against its bias, and said control member subdividing said constant stream into two partial streams which flow to said outlet means and one of which is throttled; a spring-biased movable element acting upon said control member; and spring means arranged to bias said control member associated with said laminar throttle member toward said slide piston and also including a spring biasing said movable element toward said control member.

2. A valve as defined in claim 1, and further comprising a throttling element arranges so that said one partial stream flows through the same to be throttled.

3. A valve as defined in claim 1, wherein said laminar throttle member is fixedly connected with said control member for joint movement therewith in said housing.

4. A valve as defined in claim 1, wherein said slide piston is spring-biased and provided with an inner hollow and a throttle, said throttle of said slide piston being arranged so that when the pressure medium enters said housing through said inlet means and flows through said throttle into said hollow of said slide piston, pressure drop generates in said throttle so as to move said slide piston against its bias.

5. A valve as defined in claim 4, wherein the pressure medium flows through said inlet means and said slide piston in a first direction; and further comprising a control spring biasing said slide piston in a second direction which is opposite to said first direction.

6. A valve as defined in claim 1, wherein said laminar throttle member is formed by a gauge tube which is coaxial with said slide piston and movable together with said control member under the action of said first-mentioned pressure drop.

7. A valve as defined in claim 6, wherein said control member is formed as a two-edge control piston.

8. A valve as defined in claim 1; and further comprising means for adjusting said spring means which biases said control member toward said slide piston.

9. A valve as defined in claim 8, wherein said adjusting means includes a threaded member located in said movable element and arranged for adjusting said spring means.

10. A valve as defined in claim 9, wherein said spring means includes a further spring located in said movable element and adjustable by said threaded member.

11. A valve as defined in claim 2, wherein said throttling element is formed as a throttle having a constant flow cross section.

12. A valve as defined in claim 1, wherein said control member is formed as two-edge control piston having two control edges arranged to alternately control the flow of the other of said partial streams to said outlet means.

13. A valve as defined in claim 12; and further comprising a guide member receiving said control member and provided with two annular grooves each communicating one of said control edges of said control member with said outlet means.

14. A valve as defined in claim 13, wherein said guide member forms together with said housing, an annular chamber which communicates said annular grooves of said guide member with said outlet means.

15. A valve as defined in claim 14; and further comprising a throttling element arranged so that said one partial stream flows through said throttling element to be throttled, said throttling element being located downstream of said laminar throttle member and opening into said annular chamber.

* * * * *